Sept. 7, 1965
W. H. FAINT
3,204,665
PIPE CLAMPS
Filed Dec. 21, 1962
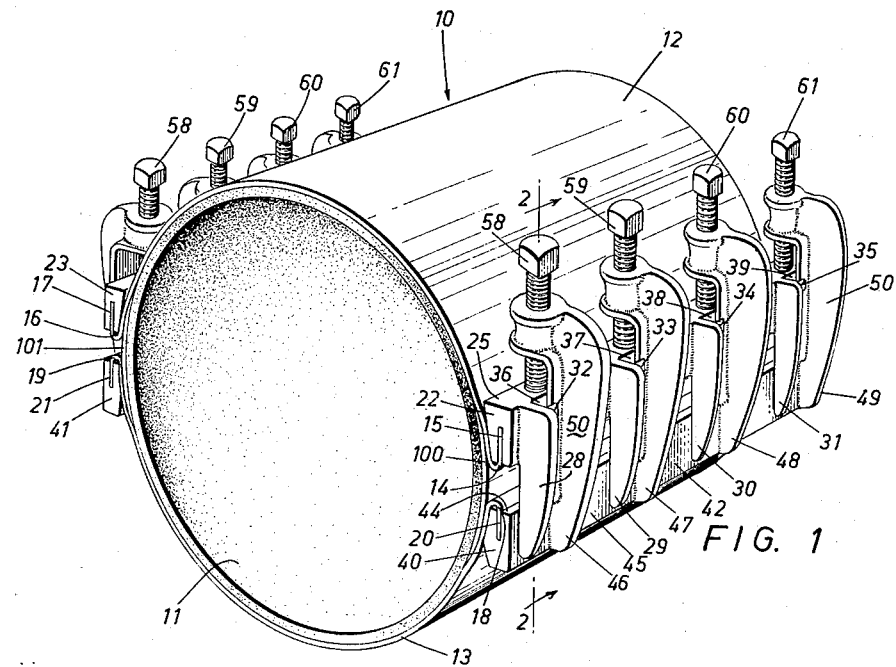
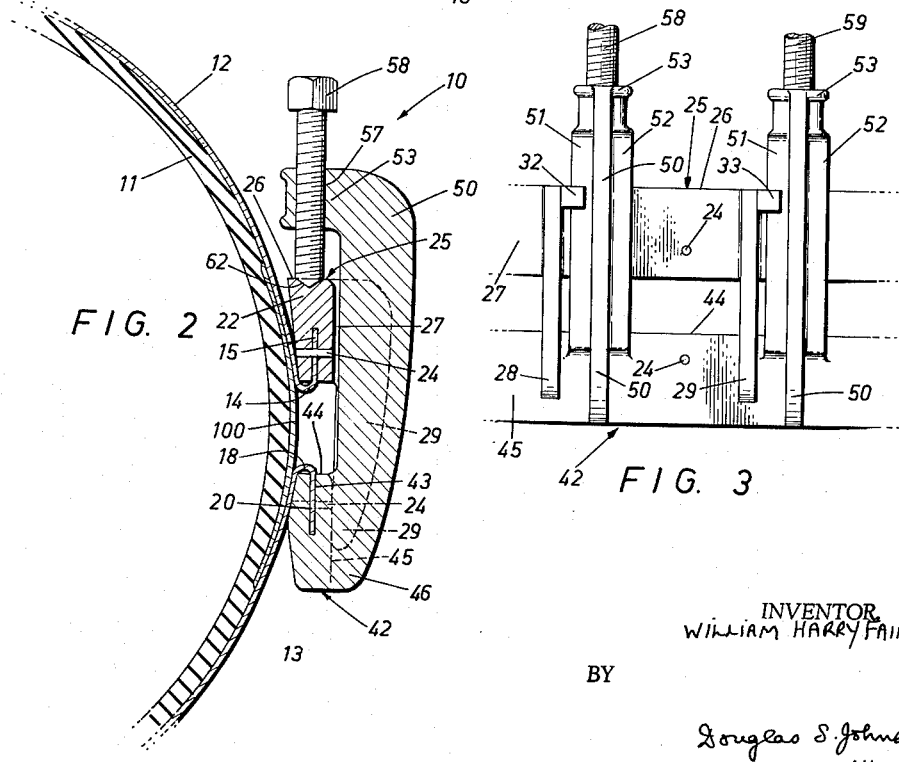
INVENTOR.
WILLIAM HARRY FAINT
BY
Douglas S. Johnson
Attorney

United States Patent Office 3,204,665
Patented Sept. 7, 1965

3,204,665
PIPE CLAMPS
William H. Faint, Oshawa, Ontario, Canada, assignor to Canadian Brass Limited, Galt, Ontario, Canada
Filed Dec. 21, 1962, Ser. No. 246,510
Claims priority, application Canada, July 12, 1962, 853,544
4 Claims. (Cl. 138—99)

This invention relates to pipe clamps for effecting joints between pipes or for repairing damaged pipes.

Many forms of pipe clamps have been revised to effect joints and seals as mentioned above. However, it is essential that these clamps be easy and fast to install or mount. As a general rule pipe clamps of the present type usually comprise a band which may be of one or more sections adapted to encircle the pipe and embrace it in pressureable engagement.

To effect this engagement side lug castings are generally provided along the lateral edges of each section, if the band comprises more than one section, and these castings are secured together by an arrangement of overlapping lugs and bolts.

The prior clamps have taken two distinct forms, one in which the securing bolts are individually positioned; and one in which the bolts are simultaneously located. The latter of these forms is the more desirable since the clamp is easier to secure. However, both types, as mentioned previously have not been capable of developing a maximum pressure and the bolts have generally been subjected to varying bending movements depending on the diameter of the pipe about which the clamp is being assembled.

It is, therefore, the main object of this present invention to provide a pipe clamp which will effectively seal a pipe joint or damaged pipe.

It is another object of this invention to provide a pipe clamp which may be easily installed.

It is another object of this invention to provide a securing mechanism for a pipe clamp which will minimize the bending moment exerted on securing bolts.

It is another object of this invention to provide a securing mechanism for a pipe clamp such that a mixmum pressure may be exerted by the securing mechanism on the seal.

To accomplish these and various other objects of the present invention, the inventor provides a pipe clamp in which a liner gasket is interposed between a resilient sleeve member and the pipe. The sleeve member is fixed in position by side casting lugs which are secured to adjacent or abutting edges of the sleeve member or members. These side casting lugs each have lugs which overlap the other side casting in a staggered relationship and of such a form that they engage each other prior to final securing without subjecting the securing bolts to a bending moment.

The bolts are also disposed with respect to the side castings so that their line of action will exert a maximum pressure on the sleeve member or members.

These and other features will be more easily recognized from the following description taken in conjunction with the accompanying drawings and in which:

FIGURE 1 is a general perspective view of a clamp in accordance with a preferred embodiment of the invention;

FIGURE 2 is a section taken along line 2—2 of FIGURE 1 and;

FIGURE 3 is a partial side view of one side of a clamp in accordance with the invention and serves to illustrate the securing mechanism.

Referring now to the drawings in FIGURE 1, the preferred embodiment of the pipe clamp is generally indicated by the numeral 10 and comprises a gasket liner 11 which may be of any suitable material and a pair of arcuate metal sleeve members 12 and 13. These sleeve members preferably of a corrosion-resistant metal and have such characteristics as will enable them to conform to a pipe about which they will be secured. Adjacent one edge of sleeve member 12 an arcuate armour member 100 of the same corrosion-resistant material is secured to provide an extension so that that diameter of the pipe clamp may be varied while presenting a substantially continuous outer surface. Adjacent one edge of sleeve member 13 a similar armour member 101 is secured to provide the same effect. In operation, these flaps will underlie the other sleeve member as illustrated. Sleeve members 12 and 13 are also substantially identical and along their lateral sides they are each reversely bent from their main curvature. For example, on one lateral side, sleeve member 12 is bent up at 14 to provide flange 15 and on the other lateral side, sleeve member 12 is bent up as at 16 to provide flange 17. Similarly, sleeve member 13 is bent back at 18 and 19 to provide flanges 20 and 21 respectively.

It will, of course, be understood that flanges 15 and 17, and 20 and 21 extend along substantially the entire length of their respective sleeve members, on flange 15.

To flanges 15 and 17, side lug castings such as 22 and 23 are secured, as shown in FIGURE 2 by rivets such as 24.

Casting 22 comprises a main body portion 25 which extends along substantially the entire length of sleeve flange 15. Main body portion 25 has an upper surface 26 with spaced apart depressions such as 62 in FIGURE 2, to correctly seat bolts such as 58, 59, 60 and 61, and an outer vertical surface 27 from which a plurality of spaced apart outwardly and downwardly extending lugs such as 28, 29, 30 and 31 project. From corresponding side surfaces of these lugs, parallel to and spaced apart from the main body portion 25, projections 32, 33, 34 and 35 extend to define slots 36, 37, 38 and 39 respectively.

As will be observed from FIGURES 1 and 2, each of lugs 28, 29, 30 and 31 has an arcuate outer surface and each projection extends horizontally and toward the adjacent lug for a predetermined short distance so that slots 36, 37, 38 and 39 are open at their top and bottom ends and on the side remote from the lug from which they project.

Side lug casting 23 is constructed in a similar manner.

To flanges 20 and 21, side lug castings such as 40 and 41 are secured and these castings are substantially identical.

Side lug casting 40 comprises a main body portion 42 which has a top surface 44 having a longitudinal slot 43 in which flange 20 is secured by any suitable means such as rivets. And from outer vertical surface 45, spaced apart lugs such as 46, 47, 48 and 49 extend outwardly and upwardly. As with lugs 47, 48 and 49, lug 46 comprises an outwardly and upwardly extending portion 50 having lips 51 and 52 projecting on either side thereof, for a predetermined distance. Portion 50 and lips 51 and 52 each join an inwardly extending lug such as 53 having a vertically extending threaded hole 57 therethrough. The holes such as 57 receive a bolt such as 58, 59, 60 or 61 and are spaced apart from the inner surfaces of their respective lugs 46, 47, 48 and 49 so that the lower end of the bolt will be correctly seated in the respective depression such as 62 in the top surface of side lug casting 22.

It will, of course, be understood that lugs 46, 47, 48 and 49 are staggered with respect to lugs 28, 29, 30 and 31 and that lips 51 and 52 on each of the first-mentioned series of lugs will be extended to engage their respective slots 36, 37, 38 and 39.

For convenience in describing the assembly of the clamp, it will be assumed that the side castings 41 and 23 have been secured together or that the clamp has but one set of side castings comprising side castings 22 and 40, secured in a similar manner as that described.

The clamp 10 is placed about the damaged area of a pipe with the gasket liner 11 interposed between sleeve members 12 and 13. Armour member 100 will underlie the inner surface of sleeve member 13 so that the clamp 10 will present a substantially continuous outer surface, and the inner surfaces of lugs 28, 29, 30 and 31 will engage the outer surface of side casting 40. In this position, the inner surfaces of lips 51 on each of lugs 46, 47, 48 and 49 will abut or engage the surfaces of projections 32, 33, 34 and 35. Side casting 40 is then pressed toward side casting 22, and lips 51 and the associated lugs 46, 47, 48 and 49 will move longitudinally with respect to the sleeve members under projections 32, 33, 34 and 35 until they reach the longitudinal extent of these projections. Then, due to the small torque exerted upon sleeve members 12 and 13, lugs 46, 47, 48 and 49 will move so that lips 51 will engage their respective slots 36, 37, 38 and 39. Lugs 46, 47, 48 and 49 will accordingly be retained in position temporarily. The action and reaction between the inner surfaces of lugs 28, 29, 30 and 31 and outer surface of 40 will tend to balance each other so that irrespective of the diameter of the pipe when finally secured, the bending moment exerted on the bolts such as 58, 59, 60 and 61 is minimal.

When the side castings 22 and 40 are in the relationship just described, bolts 58, 59, 60 and 61 may then be evenly tightened down.

As has been previously mentioned, the upper surface of casting 22 is provided with depressions such as 62 to ensure correct seating of the bolts. However, it should also be noted that the disposition of the depressions such as 62 is such that they are aligned with the plane through which flanges 15 and 20 extend or they may be disposed between this plane and the main body portion of the clamp. This arrangement ensures that the bolts will act through a plane such that a maximum clamping pressure will be developed when the bolts are tightened down and the bending movement to which the bolts may be subjected is minimized. The outer limit of the main body portion for the purposes of this specification, will be considered as that plane at which the turning to form the lateral flanges begins. This will be construed as the junction between the sleeve member and the side casting.

It is to be understood that the above described embodiment is by way of illustration only and modifications and variations may be made thereto without departing from the spirit and scope of the invention as defined by the appended claims.

What I claim is:

1. In a pipe clamp including a gasket liner and at least one arcuate sleeve member adapted to secure said gasket liner in pressureable engagement with a pipe which sleeve member includes a first lateral edge and a second lateral edge, means for securing said first lateral edge and said second lateral edge in a substantially fixed relationship comprising: a first side member secured to said first lateral edge of said sleeve member along substantially the entire length thereof, and a second side member secured to said second lateral edge of said sleeve member along substantially the entire length thereof, said first side member including at least one lug adapted to extend over said second side member to engage and substantially restrain outward movement, said second side member including at least one lug adapted to extend over said first side member, and adjustable means secured to said second side member, said means having an end surface engageable with an upper surface of said first side member to exert a pressure thereon substantially through the junctions of said first and second side members and their respective sleeve members, said lug of said first side member including a projection extending from one side thereof, said projection defining a slot with an adjacent outer wall of said first side member, said lug of said second side member including a lip adapted to be received by said slot.

2. In a pipe clamp including a gasket liner and at least one arcuate sleeve member adapted to secure said gasket liner in pressureable engagement with a pipe which sleeve member includes a first lateral edge and a second lateral edge, means for securing said first lateral edge and said second lateral edge in a substantially fixed relationship comprising: a first side member secured to said first lateral edge of said sleeve member along substantially the entire length thereof, and a second side member secured to said second lateral edge of said sleeve member along substantially the entire length thereof, said first side member including a plurality of spaced apart lugs adapted to extend over said second side member to engage and substantially restrain outward movement, said second side member including an equal plurality of lugs adapted to extend over said first side member, said lugs of said first and second members extending adjacently, said lugs of said first side member each including a projection extending from one side thereof, each of said projections defining a longitudinal slot with an adjacent outer wall of said first side member, each of said lugs of said second side members including a lip corresponding to an individual one of said slots and adapted to be received by said slot, and adjustable means secured to said second side member, said means having an end surface engageable with an upper surface of said first side member to exert a pressure thereon substantially through the junctions of said first and second side members and their respective sleeve members.

3. A pipe clamp comprising in combination: a gasket liner adapted to embrace a section of pipe, a first arcuate sleeve member and a second arcuate sleeve member each having first and second lateral edges, said members being together adapted to embrace said gasket liner and hold it in pressureable engagement with said pipe section, and means for securing said sleeve members in said pressureable engagement; said means comprising first side members, one secured to each of said first and second lateral edges of said first sleeve member, and second side members, one secured to each of said first and second lateral edges of said second sleeve member, said first side members including at least one lug adapted to extend over said second side members and restrain outward movement thereof, said second side member including at least one lug adapted to extend over an adjacent first side member and adjustable means on said second side member engageable with said first side member to exert pressure thereon substantially through the junction of said first side members and second side members and their respective sleeve members, said lug of said first side members including a projection extending from one corresponding side thereof, said projections each defining a longitudinal slot with an adjacent wall of said first side member, said lugs of said second side member each including a lip adapted to be received by their respective slot of said first side members.

4. A pipe clamp comprising in combination: a gasket liner adapted to embrace a section of pipe; a first arcuate sleeve member and a second arcuate sleeve member each having first and second lateral edges, said members being together adapted to embrace said gasket liner and hold it in pressureable engagement with said pipe section, and means for securing said sleeve members in said pressureable engagement; said means comprising first side members, one secured to each of said first and second lateral edges of said first sleeve member, and second side members, one secured to each of said first and second lateral edges of said second sleeve member, said first side members including a plurality of lugs adapted to extend over said second side members to engage and restrain outward movement thereof, said second side members including an equal plurality of lugs adapted to extend over said first side members, said lugs of said first and second side members extending adjacently, said lugs of said first side members each including a projection extending longitudinally from one corresponding side thereof, said projections each defining a longitudinal slot with an adjacent wall of said first side member, said lugs of said second side members each including a lip adapted to receive by their respective slot, and adjustable means on said second side members engageable with said first side members to exert pressure thereon substantially through the junction of said first side members and said second side members and their respective sleeve members.

References Cited by the Examiner

UNITED STATES PATENTS

| | | | |
|---|---|---|---|
| 1,966,039 | 7/34 | Muchnic | 24—279 |
| 2,311,042 | 2/43 | Ferguson. | |
| 2,897,568 | 8/59 | Hoke | 24—279 |
| 2,998,629 | 9/61 | Smith | 24—279 |
| 3,089,212 | 5/63 | Graham et al. | 287—373 X |

FOREIGN PATENTS 568,068  12/58  Canada.

CARL W. TOMLIN, *Primary Examiner.*

THOMAS F. CALLAGHAN, *Examiner.*